(12) United States Patent
Tellier et al.

(10) Patent No.: US 11,512,873 B2
(45) Date of Patent: Nov. 29, 2022

(54) ELECTRICAL CONNECTION INTERFACE OF AN ELECTRIC HEATING DEVICE FOR A MOTOR VEHICLE

(71) Applicant: Valeo Systemes Thermiques, Le Mesnil-Saint-Denis (FR)

(72) Inventors: Laurent Tellier, Le Mesnil Saint Denis (FR); Frédéric Pierron, Le Mesnil Saint Denis (FR); Serif Karaaslan, Le Mesnil Saint Denis (FR); Yann Couapel, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 541 days.

(21) Appl. No.: 16/485,867

(22) PCT Filed: Feb. 9, 2018

(86) PCT No.: PCT/FR2018/050315
§ 371 (c)(1),
(2) Date: Aug. 14, 2019

(87) PCT Pub. No.: WO2018/150125
PCT Pub. Date: Aug. 23, 2018

(65) Prior Publication Data
US 2020/0056809 A1    Feb. 20, 2020

(30) Foreign Application Priority Data

Feb. 14, 2017    (FR) ........................................ 1751171

(51) Int. Cl.
*F24H 3/04*    (2022.01)
*B60H 1/22*    (2006.01)
*F24H 9/1863*    (2022.01)

(52) U.S. Cl.
CPC .......... *F24H 3/0441* (2013.01); *B60H 1/2225* (2013.01); *F24H 9/1872* (2013.01); *F24H 2250/04* (2013.01)

(58) Field of Classification Search
CPC .... F24H 3/0441; F24H 3/0405; F24H 3/0429; F24H 3/0435; F24H 3/0447; F24H 3/047;
(Continued)

(56) References Cited

U.S. PATENT DOCUMENTS 4,963,716 A * 10/1990 Van Den Elst .......... H05B 3/14
219/202
2015/0034626 A1* 2/2015 Kominami ........... B60H 1/2218
219/505

FOREIGN PATENT DOCUMENTS

CN    2156644 Y    2/1994
CN    1673642 A    9/2005
(Continued)

OTHER PUBLICATIONS

International Search Report and Written Opinion issued in corresponding International Patent Application No. PCT/FR2018/050315, dated May 5, 2018 (12 pages).
(Continued)

*Primary Examiner* — Shawntina T Fuqua
(74) *Attorney, Agent, or Firm* — Osha Bergman Watanabe & Burton LLP

(57) ABSTRACT

An electrical connection interface (100) of a device for electrically heating a flow of air flowing within a ventilation, heating and/or air conditioning system of a motor vehicle comprises, in a panel (102), at least one notch that is dimensioned for receiving a connection terminal (126) mounted at the end of an electrode of a heating element of the electric heating device. The electrical connection interface comprises at least one device for limiting the shear
(Continued)

(101) of the connection terminal which extends proud from the panel (102) adjacent to the notch.

20 Claims, 4 Drawing Sheets

(58) Field of Classification Search
CPC .. F24H 3/0476; F24H 9/1872; F24H 2250/04; B60H 1/2225; B60H 1/08; B60H 1/2215; H05B 2203/023; H05B 3/06; H05B 3/03; H05B 3/10; H05B 3/50; B65F 1/14; B65F 1/16; B65F 1/1615
See application file for complete search history.

(56) References Cited

FOREIGN PATENT DOCUMENTS

| | | | |
|---|---|---|---|
| CN | 1897767 | A | 1/2007 |
| CN | 201066202 | Y | 5/2008 |
| CN | 201112691 | Y | 9/2008 |
| CN | 201117941 | Y | 9/2008 |
| CN | 201608337 | U | 10/2010 |
| CN | 201985294 | U | 9/2011 |
| DE | 102003032772 | * | 1/2007 |
| DE | 102006032772 | * | 1/2007 |
| DE | 102006032772 | A1 | 1/2007 |
| EP | 1462733 | A1 | 9/2004 |
| EP | 1580495 | A1 | 9/2005 |
| KR | 20100000610 | U | 1/2010 |
| KR | 20120010862 | A | 2/2012 |
| WO | 2006/123915 | A1 | 11/2006 |
| WO | 2006123915 | * | 11/2006 |
| WO | 2007/129608 | A1 | 11/2007 |

OTHER PUBLICATIONS

The First Office Action issued in corresponding Chinese Application No. 201880011894.0, dated Mar. 3, 2021 (14 pages).
Second Office Action in corresponding Chinese Application No. 201880011894.0, dated Jan. 18, 2022 (12 pages).

* cited by examiner

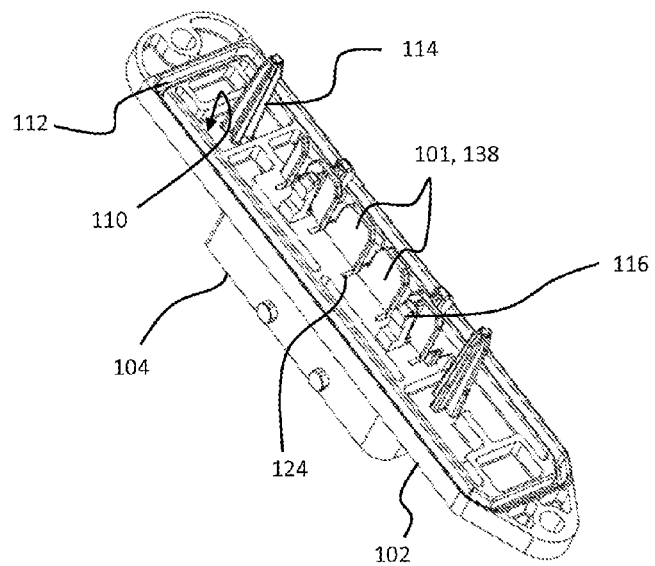
Figure 4
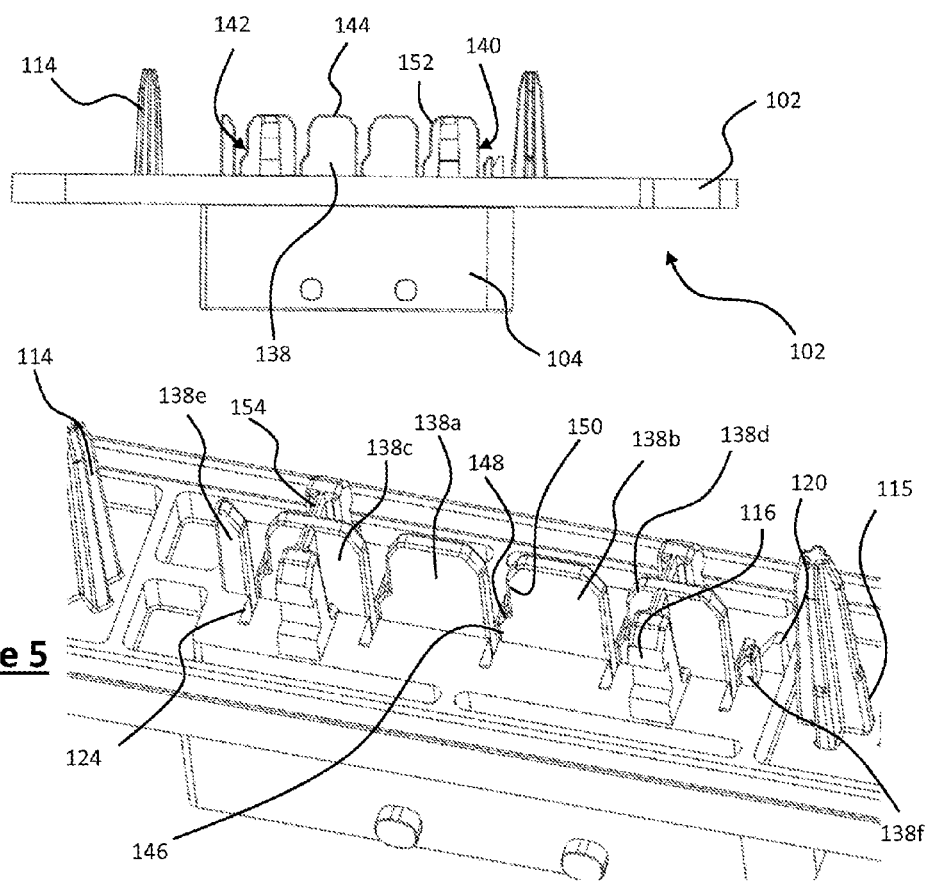
Figure 6
Figure 5

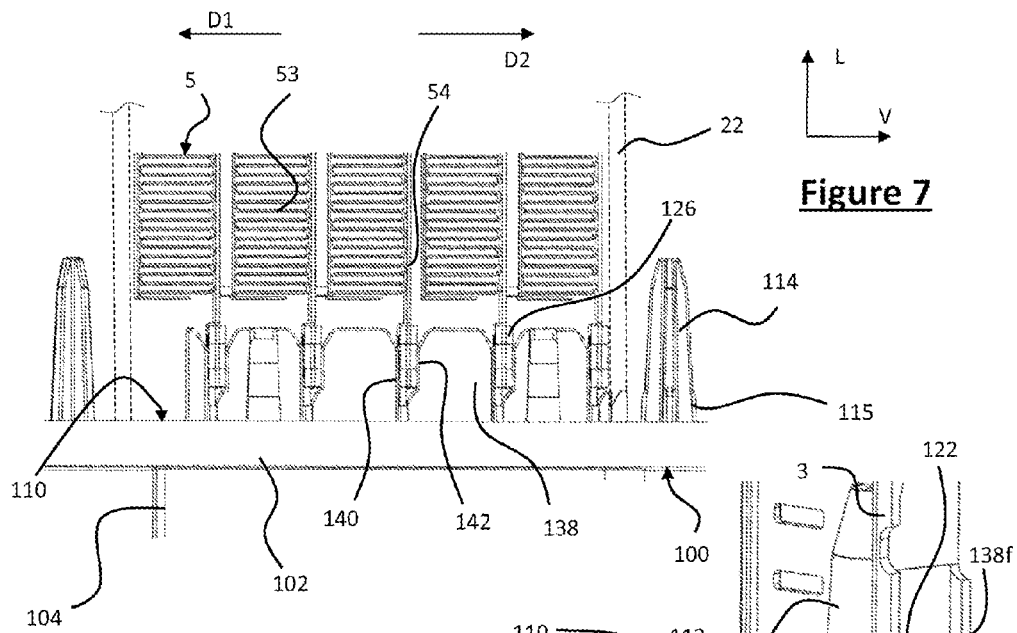
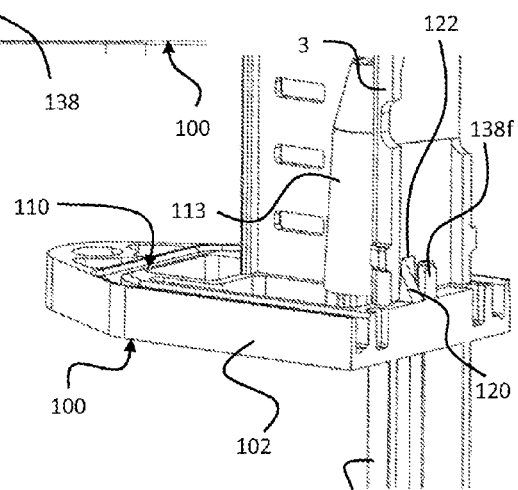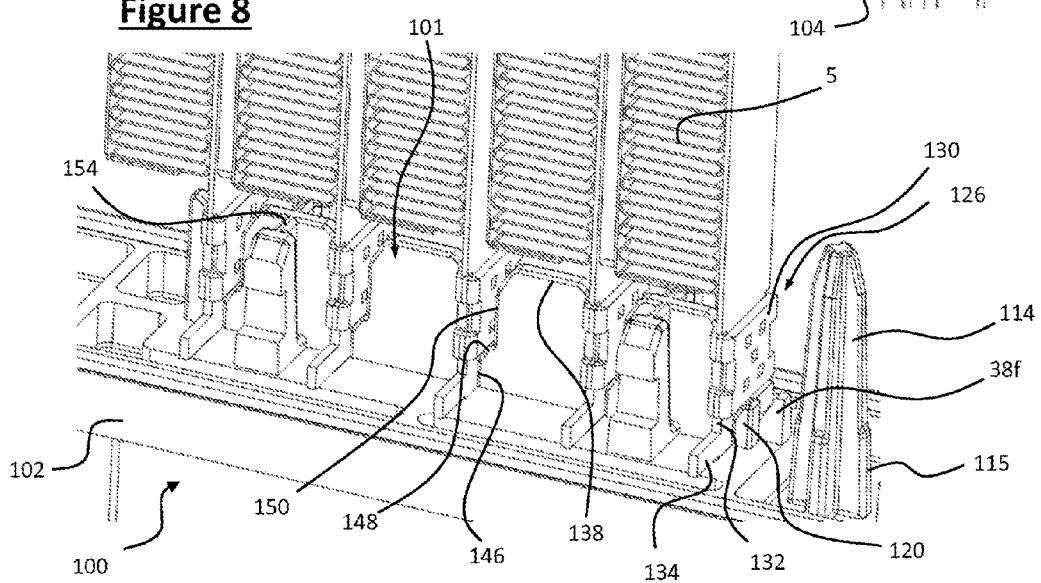

ELECTRICAL CONNECTION INTERFACE OF AN ELECTRIC HEATING DEVICE FOR A MOTOR VEHICLE

The invention relates to electric heating devices, particularly for a heating, ventilation and/or air conditioning installation of a motor vehicle.

Heating air intended for heating the interior of a motor vehicle with a thermal engine, as well as for defogging and defrosting glazed surfaces, is provided by exchanging heat between an air flow and a thermal engine coolant circulating in a heat exchanger.

Upon start-up of the thermal engine, and for a certain period following the time of start-up, the calories carried by the engine coolant are insufficient for providing rapid and effective heating of the interior. This is more particularly observed with some types of engine and is a disadvantage in cold weather, not only because the internal temperature of the interior cannot be raised rapidly, but also because the defogging and defrosting functions cannot be effectively provided.

In order to overcome these disadvantages, mounting an additional electric heating device in the air flow directed toward the interior has been proposed.

Such an additional electric heating device generally comprises a frame having a heating body comprising a plurality of parallel conductive plates, between which are mounted resistive heating elements, for example, positive temperature coefficient (PTC) resistors, and radiating elements increasing the heat exchange surface with the air flow passing through the electric heating device. These various elements are assembled so as to form at least one heating element, the one or more heating elements forming the heating body then being inserted into a housing thereof.

The heating elements are provided at one end of a connection terminal that enables electrical connection to an electrical power supply network specific to the vehicle. A connection interface is mounted at one end of the frame to close the housing in which the heating elements are disposed, and this connection interface comprises notches that the connection terminals pass through in order to be engaged on the other side of the connection interface.

The contact zone between the connection terminal and the walls defining the notch, at one end of the heating element, enable the heating element to be held but generate a risk of the connection terminal shearing when the heating element is subject to vibrations and moves inside the housing. This shearing risk can be even greater when the thickness of the electrodes is reduced, within a context of miniaturizing the equipment of the motor vehicles and of reducing costs.

The aim of the invention is to propose an additional electric heating device, and particularly a connection interface equipping such a device, that allows the risk of shearing the heating elements to be obviated or at least limited.

To this end, the invention proposes an electrical connection interface of a device for electrically heating an air flow circulating inside a heating, ventilation and/or air conditioning installation of a motor vehicle, said connection interface comprising, in a panel, at least one notch sized for receiving a connection terminal mounted at the end of an electrode of a heating element. According to the invention, the electrical connection interface comprises at least one device for limiting the shearing of the connection terminal, which device extends by projecting from the panel in the vicinity of the notch.

According to various features of the invention, taken separately or in combination, provision can be made for the following:

the shearing limitation device comprises at least one pair of ribs, which respectively extend by projecting from the panel and which are arranged on either side of the corresponding notch;

the ribs of a pair of ribs are oriented perpendicular to the orientation of the corresponding notch;

the electrical connection interface comprises a plurality of notches and a plurality of ribs associated in pairs with each of the notches;

all the ribs extend perpendicular to the notches;

the ribs are aligned one after the other; alignment of the ribs is understood to mean that the successive arrangement of the ribs forms an even straight line, only intersected by the spacings between the ribs above the notches;

the ribs are centered on the corresponding notch; centering of the ribs is understood to mean that the ribs extend halfway up the corresponding notch relative to the direction in which the notches extend;

the thickness of the ribs, i.e. the size of the ribs in the direction of extension of the notches, is less than the size of the notches in the same direction; the thickness of the ribs is of the order of 10 to 50% of the corresponding size of the notches;

at least two successive ribs are identical;

a rib disposed at the end of the series formed by the plurality of ribs is smaller than the corresponding size of the other ribs;

at least one rib extends from one notch to the neighboring notch;

the shearing limitation device formed by a pair of ribs is such that a first rib has a straight lateral edge and that a second rib has an uneven profile lateral edge;

the uneven profile lateral edge has a proximal portion, which extends from the panel perpendicular to said panel and in the direct vicinity of the notch, and a distal portion forming a step relative to the proximal portion that is offset relative to the notch;

the proximal portion and the distal portion are separated by an inclined intermediate portion forming a ramp for guiding the connection terminal toward the corresponding notch;

the free end of at least one rib has a chamfer for guiding the connection terminal;

the rib disposed at the end of the series is formed solely by one proximal portion in the direct vicinity of the notch;

the electrical connection interface comprises at least one click and ratchet finger configured to engage with a bore formed in a frame of the electric heating device and at least one rib is rigidly connected to said click and ratchet finger; during the click and ratchet fixing of the frame with the connection interface, the finger is set in position through its connection to the rib, and the elasticity required for the click and ratchet fixing is mainly obtained through deformation of the frame supporting the bore; in this way, the click and ratchet fixing means are more impact resistant and reliable fixing of the electrical connection is provided;

the panel further comprises a stud disposed on the boundary of the shearing limitation device; this stud is positioned and sized to engage with a recess produced in one of the walls defining the frame and against which the panel of the electrical connection interface comes into abutment; in this way, the stud can form a means for keying the assembly of the connection interface;

the electrical connection interface comprises at least one positioning pin; according to one variant, two positioning pins can be provided that are arranged on either side of the series of associated notches and ribs forming a shearing limitation device.

The invention also relates to an additional electric heating device comprising a connection interface as previously described and a frame, in which the at least one heating element is accommodated, with the connection interface being configured to be mounted at one end of the frame in order to connect the device to an electrical network of the vehicle and the power supply of the heating elements.

In this additional electric heating device provision can be made for the frame to comprise walls, which include at least one proximal vertical wall, on which the connection interface is fixed. Furthermore, provision can be made for at least one rib to extend from the panel of the connection interface by having a size perpendicular to the panel that is less than the size of the proximal wall of the frame in the same direction. In this way, the free end of the rib does not exceed the proximal wall of the frame and it is not located in the air flow intended to pass through the heating elements.

Furthermore, at least one rib can extend from the panel of the connection interface so as to be in contact with a heat exchange fin of a heating element.

According to the invention, the additional heating device comprises a part forming a device for limiting the travel of the heating elements and comprising one or more openings configured to each receive a pin rigidly connected to the frame, said pin being plastically deformed inside the opening, so as to press the travel limitation device against the heating elements and so as to exert a bearing force in order to press them into their housing in the frame.

According to one feature of the invention, the travel limitation device is arranged so that the bearing force that it exerts on the heating elements when the one or more pins is/are plastically deformed is perpendicular to the direction for inserting the heating elements into the notches arranged in the connection interface for the electrical connection.

Further features and advantages of the present invention will become more clearly apparent from the description and drawings, in which:

FIG. 1 is a perspective overview of an electric heating device according to one aspect of the invention, particularly comprising five radiating elements forming two heating elements arranged in a frame, which at one end supports an electrical connection interface for the heating elements;

FIG. 2 is a view, in another perspective, of the device of FIG. 1, which shows the face of the connection interface opposite the frame, and the electrical connection end of four of the five radiating elements, with one of the radiating elements having been removed in order to show the notch by which the electrical connection end of the heating elements passes through the electrical connection interface;

FIG. 4 is a view, in another perspective, of the connection interface of FIG. 3, more specifically showing the five notches provided for the electrical connection of each of the five radiating elements;

FIG. 5 is a perspective view of a specific detail of the connection interface of FIG. 3, which shows a connection terminal mounted at the end of an electrode of a heating element as it is plugged into one of the notches of the connection interface;

FIG. 6 is a front view of the connection interface of FIG. 3;

FIG. 7 is a front view, similar to that of FIG. 6, which shows the heating elements as they are connected by means of the electrical connection interface;

FIG. 8 is a perspective view of a specific detail of the connection interface of FIG. 3, which shows each of the heating elements and their associated connection terminal; and FIG. 9 is a profile, shown as a perspective view, showing means for installing the frame of the electric heating device on the panel of the connection interface;

Figure 1:
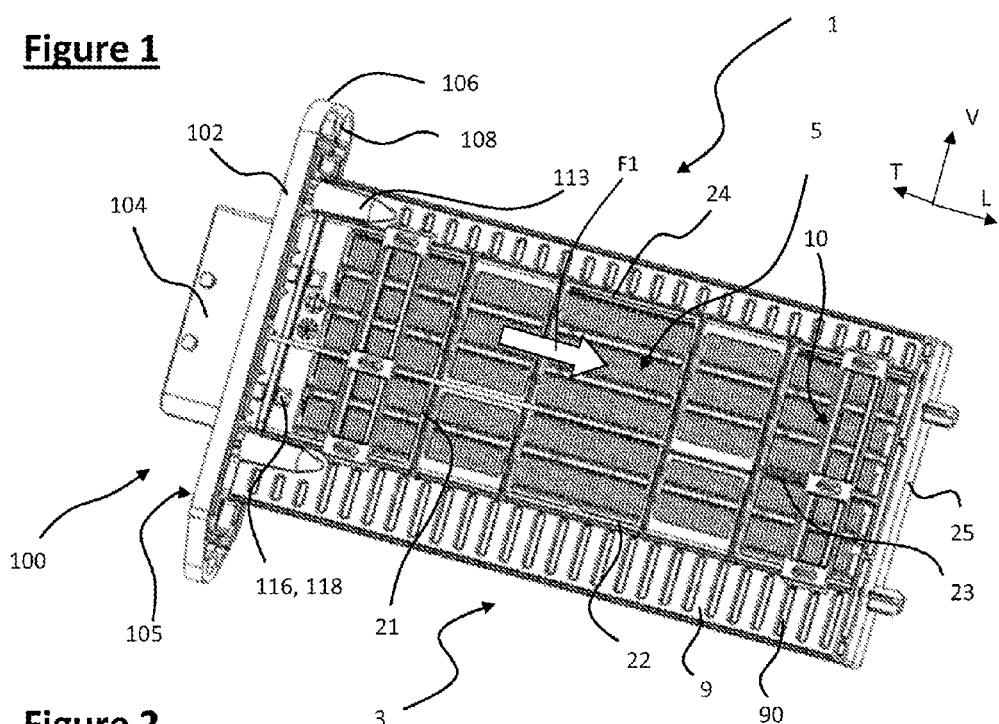
Figure 10:
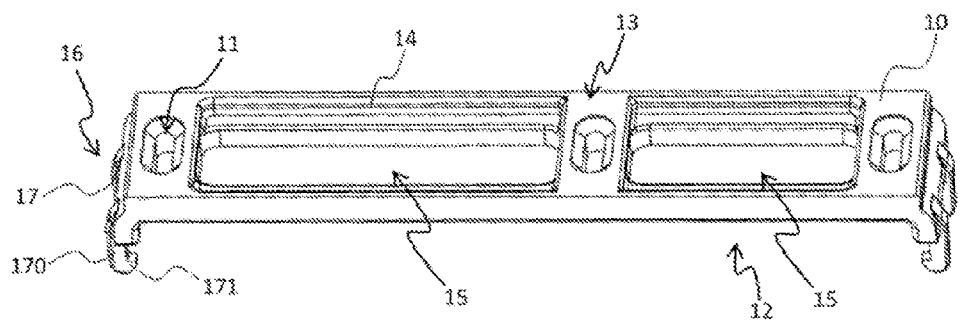
Figure 11:
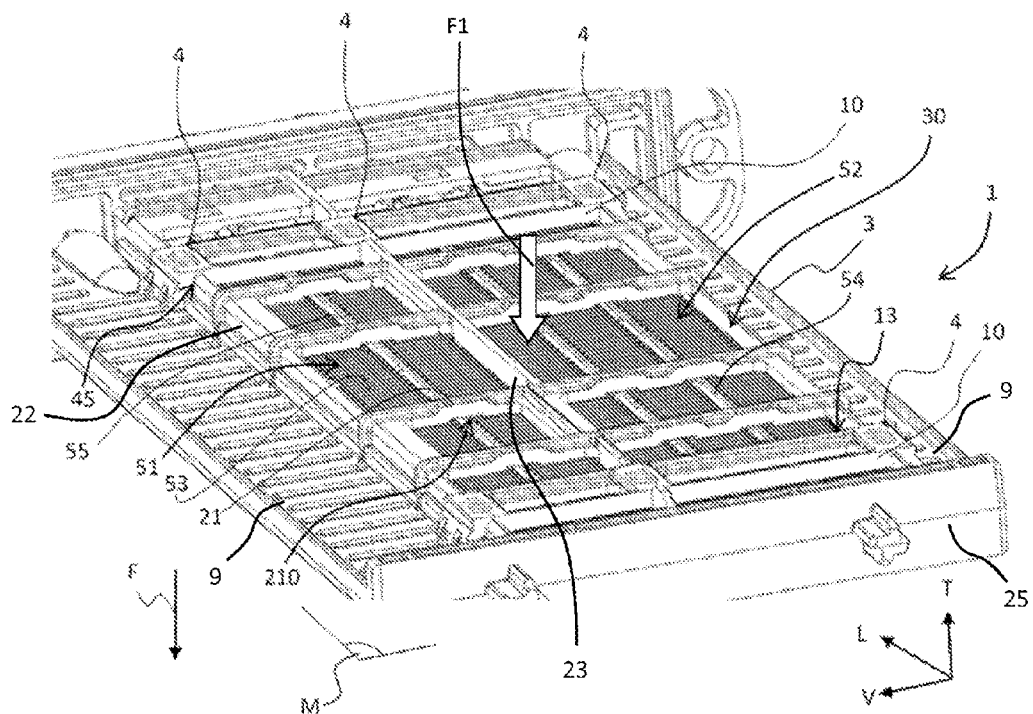

FIG. 10 is a view of a device for limiting the travel of the heating elements that is configured to be disposed on the frame of the electric heating device and is set in position thereon by plastic deformation of pins rigidly connected to the frame, shown in FIG. 1 in their original state before deformation; and FIG. 11 is a view of the additional electric heating device of FIG. 1 after plastic deformation of the rigidly connected pins for setting the position of the travel limitation device against the heating elements.

Firstly, it should be noted that the figures disclose the invention in a detailed manner for implementing the invention. Of course, said figures could be used to better define the invention where appropriate. However, it is to be noted that these figures only disclose some of the possible alternative embodiments according to the invention.

Throughout the following description, reference will be made to an orientation as a function of the longitudinal L, vertical V and transverse T axes, as they are arbitrarily defined by the L, V, T trihedron shown in the figures. The choice of designations for these axes does not limit the orientation that the device can assume with respect to its application to a motor vehicle.

An additional electric heating device according to the invention, as shown in the figures, is capable of being accommodated through an air circulation conduit of a ventilation, heating and/or air conditioning installation, so as to convert electric power, particularly that which is gathered from the vehicle, into thermal energy that is returned in the air passing through said ventilation, heating and/or air conditioning installation. The installation is not shown herein, but it will be understood that a main conduit of this installation conventionally comprises an opening that is produced in the wall for the insertion of the additional heating device.

FIG. 1 shows an additional electric heating device 1 according to the invention, comprising a frame 3, in which heating elements 5, capable of converting an electric current into thermal energy, are accommodated. To ensure that the heating elements 5 do not travel inside the frame 3, the electric heating device 1 in this case is equipped with two devices 10 for limiting the travel of the heating elements 5 that will be described in detail hereafter.

The additional electric heating device further comprises a connection interface 100 disposed at a proximal end of the case for connecting the device to an electrical network of the vehicle and the electrical power supply of the heating elements 5, and, according to the invention, this connection interface comprises a device 101 for limiting shearing of the heating elements in the connection zone.

The connection interface 100 helps to close, when it is applied on the frame and as is shown in FIG. 1, the housings provided in the frame for receiving the heating elements, so as to hold them in position. The connection interface 100 extends in a plane defined by the transverse axis T and the vertical axis V.

It is understood that the heating elements are inserted into the frame along the longitudinal axis L through an opening forming an entry provided at a longitudinal end of the frame 3, which is subsequently closed by installing the connection interface 100.

The heating elements 5 comprise means that are capable of exchanging heat, such as radiating elements 53 allowing the heat exchange surface to be increased, with the air flow F1 passing through the electric heating device 1. The heating elements 5 also comprise electrodes 54, between which resistive heating elements, for example, positive temperature coefficient (PTC) resistors 55, are disposed, and against which the radiating elements are fixed. The electrodes 54 and the PTC resistors 55 allow an electric current to be converted into thermal energy. It is to be noted that the positive temperature coefficient resistors 55 can be adhered directly onto the radiating elements 53.

The frame 3 comprises a heating compartment 30, forming a reception casing for the heating elements 5 and it is configured to engage, at one of the ends thereof, with a connection interface 100. The heating elements 5 are inserted into housings arranged inside the heating compartment 30. Furthermore, the connection interface 100 closes an entry, through which the heating elements are inserted into the housings of the heating compartment, at the same time that they allow the electric heating device 1 to be connected to an electrical network of the vehicle allowing the heating elements 5 to be electrically powered.

The frame 3 and the heating compartment 30 have a rectangular parallelepiped shape. The two main faces of the frame 3, respectively front (shown in FIGS. 1 and 11) and rear (not shown in the figures), are perforated to allow the passage of an air flow F1 and the diffusion of heat in the conduit in which the electric heating device 1 is installed. The frame 3 comprises a median plane M corresponding to a plane passing through one half of the frame and being perpendicular to a direction followed by the air flow F1 circulating through the electric heating device 10. It is understood that the front and rear faces extend in planes parallel to the median plane M.

It is also to be noted that the frame 3 comprises a bar 9 extending from the heating compartment 30 in the median plane M of the frame, so as to form a free end of the frame 3. This bar 9 stiffens the frame 3 and it comprises aeration slots 90 enabling through-circulation of the air flow. The aeration slots 90 extend along the vertical axis V of the heating device 1. More specifically, the frame 3 comprises two bars 9 disposed on either side of the heating compartment 30. The two bars 9 have different heights, measured along the vertical axis V.

As shown in FIG. 1 in particular, the housings of the frame 3 are defined by vertical 21 and longitudinal 22, 23, 24 walls.

More specifically, vertical walls 21, disposed at even or uneven intervals from each other, extend along the vertical axis V in the vicinity of the heating compartment 30, in order to stiffen said compartment without adversely affecting the release of heat. Vertical walls 21 are arranged both on the front face and on the rear face of the frame 3, such that these vertical walls 21 define a thickness, measured along the transverse axis T, of the housings.

Longitudinal walls 22, 23, 24, in this case three walls, that are parallel to each other define the longitudinal sides of the housings inside the heating compartment 30 and, where appropriate, the longitudinal sides of this heating compartment. Among the longitudinal walls, a distinction is made between two lateral walls 22, 24 and an intermediate wall 23 disposed between these lateral walls 22, 24. The vertical walls 21 extend substantially perpendicular to these longitudinal walls 22, 23, 24 from one longitudinal wall 22, 23, 24 to the next. According to the embodiment of the invention, the longitudinal walls 22, 23, 24 extend at least along the entire length of the heating elements 5.

Two distinct housings are defined in the heating compartment 30 that are separated from each other by the intermediate longitudinal wall 23. A first housing is defined by a first lateral longitudinal wall 22, the vertical walls 21 and the intermediate longitudinal wall 23, whereas a second housing is defined by a second lateral wall 24, the vertical walls 21 and the intermediate wall 23. The housings are closed at a first longitudinal end by a bottom wall 25 and, at the opposite end, by the connection interface 100 when said interface is applied on the frame 3, as shown in FIG. 1 in particular. The bottom wall 25 and the connection interface 100 extend in parallel planes defined by the transverse axis T and the vertical axis V.

Advantageously, the frame 3, defined by the walls 21, 22, 23, 24, 25 thereof, can be produced as one piece. The heating elements 5 are then inserted along the longitudinal axis L toward the bottom wall 25, then the connection interface 100 is rigidly connected to the frame 3 so as to close the entry to the housings. Alternatively, the frame 3 is produced as two shells, with the first shell comprising the perforated front face of the frame 3 and the second shell comprising the perforated rear face of the frame 3. In this case, the direction for inserting the heating elements can be the same as before or can follow the transverse axis T toward one of the two shells.

The housings can assume sizes that vary as a function of the distance separating the walls 21, 22, 23, 24, 25 defining each housing. The first housing in this case is sized to receive a heating element 51 equipped with two radiating elements, whereas the second housing is sized to receive a heating element 52 equipped with three radiating elements, as is particularly referenced in FIG. 11.

The connection interface 100 will now be described that is introduced to close the opening of the frame forming an entry for inserting the heating elements 5 into the heating compartment.

The connection interface 100 comprises a panel 102, which extends perpendicular to the walls 21, 22, 23, 24, 25 of the frame 3, when the connection interface is in the closed position of the frame, and a sheath 104, which extends by projecting from an outer face 105 of the panel 102, i.e. a face turned opposite the frame, by defining a cavity for receiving means for connecting to an electrical network, not shown herein.

The connection interface comprises mechanical fixing elements for enabling the additional electric heating device to be positioned in a heating, ventilation and/or air conditioning installation, with these mechanical fixing elements being arranged at the vertical ends of the panel and assuming the form of fixing lugs 106, in which fixing holes 108 allow screwing means to engage with tapped means rigidly connected to the conduit of the heating, ventilation and/or air conditioning installation. It is understood that other mechanical fixing means could be implemented without departing from the scope of the invention, through soldering, clinching, bonding or clipping operations, for example.

Furthermore, the panel 102 comprises, on the inner face 110 thereof, i.e. the face turned toward the frame, a peripheral groove 112, particularly shown in FIG. 4, in which provision can be made for positioning a seal for providing the air seal between the inside of the heating, ventilation and/or air conditioning installation, where the heating elements extend, and the outside of the installation, where the panel 102, and particularly the sheath 104 of the connection interface, extends.

The electrical connection interface also comprises at least one positioning pin 114, which extends by projecting from the panel, from the inner face 110 of said panel. The purpose of this positioning pin 114 is to engage, for guidance when installing the connection interface on the frame, with a shaft 113 of corresponding size provided on the frame. In the example shown, the electrical connection interface 100 comprises two positioning pins 114 arranged on either side of the shearing limitation device 101 that will be described hereafter.

Each positioning pin 114 has a conical shape, with a cross-piece section, and the positioning pins extend parallel to each other with an angularly offset orientation of the cross-pieces, particularly offset by 90°, from one pin to the next. Furthermore, one of the positioning pins has, at its base, in the vicinity of the junction with the panel, a thickened portion 115 on at least one of the branches forming the cross-piece, so that a force is provided at the end of guiding that helps to precisely position the connection interface 100 on the frame 3.

Furthermore, the electrical connection interface 100 comprises at least one click and ratchet finger 116 configured to engage with a bore 118 formed in a wall of the frame of the electric heating device. When the electrical connection interface is assembled on the frame, a resilient deformation allows the click and ratchet finger to be inserted into the bore. The interaction between the shearing limitation device according to the invention and the click and ratchet fixing means, and the advantage of such interaction, will be described hereafter.

With reference to FIGS. 3 to 9, it also can be noted that the panel of the connection interface comprises a stud 120 disposed on the boundary of the shearing limitation device 101. This stud is positioned and sized to engage with a recess 122 produced in one of the walls defining the frame. When rigidly connecting the frame and the connection interface, the stud 120 is intended to be accommodated in the recess 122, as shown in FIG. 9. In this way, the stud can form a means for keying the assembly of the connection interface.

The connection interface 100 has notches 124 (particularly shown in FIG. 4) that pass through the panel 102 by extending from the inner face 110 up to the outer face 105 of this panel. The notches 124 emerge on the outer face 105 inside the sheath 104, the sizes of which are able to allow source electrical connection means, i.e.

means directly connected to the vehicle network, to be received in this sheath 104.

In the example shown, in which the frame 3 is configured to accommodate five radiating elements, the interface is provided with five notches sized to respectively receive a connection terminal 126 arranged at an end of an electrode associated with a radiating element 5. These notches are evenly spaced apart, i.e. they are spaced apart from each other by a constant value.

Figure 2:
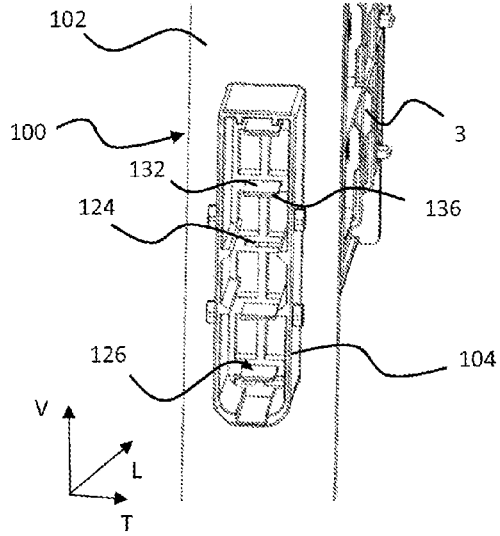
Figure 3:
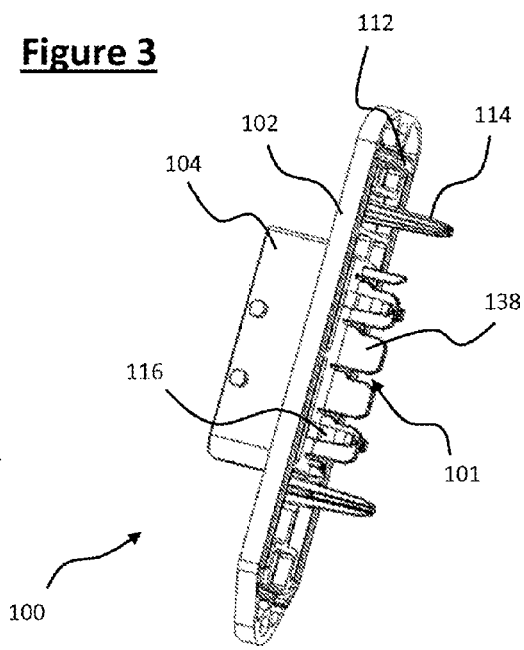
FIG. 3 is a view, in a similar perspective to that of FIG. 1, of the connection interface only.

FIG. 2 shows the free end of electrical connection terminals 126, emerging from the notches inside the sheath 104, which terminals are able to engage with the source electrical connection means when they are press fitted in the sheath 104. The electrical connection terminals 126 are, as is particularly shown in FIG. 8, rigidly connected to electrodes 54 of the heating elements, and they pass through the notches 124 (shown in FIG. 2) in order to allow connection, with connection means disposed on one side of the connection interface, of the heating elements disposed on the other side of this interface. It is understood, particularly from the illustration of FIG. 2, that the notches 124 have a defined section for receiving and guiding these electrical connection terminals 126 through the panel of the connection interface, so that they can, on the one hand, be rigidly connected to the electrodes 54 inside the frame of the device and so that they can, on the other hand, extend into the sheath 104 by projecting from the outer face 105 of the panel 102.

As is particularly shown in FIG. 8, an electrical connection terminal 126 for connecting to the electrical wiring set of the vehicle is disposed on the free end of each of the electrodes extending the heating elements at a proximal end. The electrical connection terminal particularly has a part 130 for fixing to the electrode and a connection part formed by a tab 132 that extends into the extension of the electrode.

The part 130 for fixing to the electrode assumes the form of a sleeve that is slightly wider than the width of the electrode (shown in FIG. 8), so as to be able to surround the associated electrode and be rigidly connected thereto by soldering or crimping, for example, or even by clinching.

The connection part comprises the tab 132, the width of which is substantially equal to that of the electrode, and it further comprises two fins 134, which extend by projecting from each side of the connection part so as to form a shoulder stop for the longitudinal displacement of the terminal. The free end of the tab can have a slight bevel 136 (shown in FIG. 2), particularly for facilitating its insertion in the corresponding notch.

As a result of the thickness of the various parts of the electrical terminal there is a thickened portion in the vicinity of the part 130 for fixing to the electrode.

The shearing limitation device 101 will now be described in further detail as it is arranged in the connection interface according to the invention, particularly with reference to FIGS. 3 to 9.

The shearing limitation device 101 is arranged on the inner face 110 of the panel and it extends by projecting from this inner face in the vicinity of each of the notches 124.

The purpose of the shearing limitation device is to increase the length of the contact zone between the electrical connection interface and the connection terminal, so that this terminal is not only maintained at the height of the notch, i.e. at the thickness of the panel, but that it is guided over a longitudinal size, in the direction for inserting the connection terminals into the notch, that is greater than the thickness of the panel. Thus, an element projecting from the panel is provided that is configured so that it extends along, in contact or immediately facing the part of the connection terminal that is not pushed into the notch. This projecting element of the panel extends toward the frame to increase the contact zone with the connection terminal and the electrode on the side of the heating element, i.e. on the side that is likely to vibrate the most.

According to one feature of the invention, the shearing limitation device comprises at least one pair of ribs 138 arranged on either side of one of the notches. In the example shown in the figures, in which the connection interface comprises five notches in its panel, five pairs of ribs are provided, with each pair being respectively associated with one of the notches.

The connection terminal is thus held on either side of this terminal and, through the contact with or the immediate vicinity of a stop wall formed by an edge of a rib, the possible travel of the heating elements and the resulting shearing risk is significantly limited.

The ribs 138 are oriented perpendicular to the orientation of the associated notch.

In the example shown, the notches extend in a transverse direction and the ribs mainly extend in a vertical direction. It is to be noted that, in the example shown, the ribs are aligned one after the other, forming a guideline, on which the ribs are disposed. The alignment of these ribs is centered relative to the notches, so that the guideline resulting from the alignment of the ribs passes through the center of the segment formed by either of the notches.

The ribs 138 are in the form of a thin plate, which has two lateral edges 140, 142 integrally formed with the panel and a free end edge 144, parallel to the plane in which the panel lies. It is possible to characterize the notches by each of these sizes in the longitudinal, vertical and transverse direction.

In the longitudinal direction, i.e. the direction along which the rib extends away from the panel, at least one rib extends so that the free end 144 of the rib is facing the part 130 for fixing to the electrode of the connection terminal when the heating element is mounted in its connection position with the connection terminal inserted into the corresponding notch. In the example shown, each of the ribs 138 longitudinally extends in this way, with the exception of a rib disposed at the end of the alignment of the ribs. By way of an example, the height of the largest ribs, i.e. the size thereof in the longitudinal direction, is between 10 and 12 mm.

In the transverse direction, the thickness of the ribs 138 is approximately 1.5 to 2 mm, i e a thickness of approximately 15 to 30% of the corresponding size of the notch, with the length of the notch in this transverse direction being able to be, by way of an example, between 6 and 8 mm.

In the vertical direction, at least one rib 138 extends from one notch to the neighboring notch, over a distance between 10 and 12 mm.

As previously stated, the shearing limitation device 101 is formed by a pair of ribs 138 disposed on either side, in the vertical direction, of a notch and therefore on either side of the connection terminal intended to be engaged in the notch. The shearing limitation device 101 is configured so that each of the ribs is in contact, or at least in very close contact by virtue of matching shapes, with the connection terminal that is accommodated between the ribs. Thus, the length of the contact zone between the ribs and the connection terminals is increased in the longitudinal direction, i.e. the direction for inserting the heating elements into the notches. The previously described shape of the connection terminal involves a thickened portion in the vertical direction in the vicinity of the sleeve forming the part for fixing to the electrode and the shape of the ribs coming in front of the connection terminal is affected by this thickened portion.

In this way, for a pair of ribs introduced on either side of a notch, a first rib 138 has a straight lateral edge 140 and a second rib 138b has an uneven profile lateral edge 142.

According to one feature of the invention, at least one rib 138 is common to two pairs of successive ribs. In other words, a rib can have a straight lateral edge 140 and an uneven profile lateral edge 142 and assist in the formation, on the one hand, of a first pair of ribs arranged either side of a first notch, by having its straight lateral edge facing the uneven profile lateral edge of another rib, and, on the other hand, a second pair of ribs arranged on either side of a second notch, this time by having its uneven profile lateral edge facing the straight lateral edge of another rib. It is understood that, in order for this to be achieved, this rib needs to extend in the vertical direction from one notch to the next.

It is thus possible to produce a plurality of successive ribs 138, in this case four according to the example shown, which have at least identical lateral edges, namely a first straight lateral edge and a second uneven profile lateral edge. In the example shown in the figures, at least two central ribs are identical.

The uneven profile lateral edge 142 of the ribs successively has, from the panel, a proximal portion 146, an intermediate portion 148 and a distal portion 150. The proximal portion assists in the formation of the base of the rib, which extends from the panel perpendicular to this panel and in the direct vicinity of the notch. The direct vicinity of the notch is understood to mean that the lateral edge of the rib and the edge defining the notch are disposed in the same plane.

The distal portion 150 forms a step relative to the proximal portion 146, offset relative to the notch, and the intermediate portion 148 separating the proximal portion and the distal portion of this uneven profile edge is an inclined portion forming a ramp for guiding the connection terminal toward the corresponding notch. Furthermore, the free end of the distal portion, i.e. the corner of the rib arranged opposite the panel, has a chamfer 152, so as to here again form a slope for guiding the connection terminal toward the notch.

The ribs arranged at the end of the series formed by the plurality of ribs in this case have a distinct shape due to the space available at the junction of the frame and the panel and due to the fact that, for a rib that is arranged at the end of the series, only one of the lateral edges thereof has a shearing limitation function. Consequently, at least one of these ribs 138e, 138f arranged at the end of the series can be smaller than the corresponding size of the other ribs.

A first end rib 138e is basically formed in the longitudinal direction, i.e. the direction perpendicular to the panel, by assuming the shape of a pin, with a size in the vertical direction that is less than that of the other ribs and with a size in the longitudinal direction that is equal to that of the other ribs. In this way, the straight lateral edge 140 that this first end rib 138e has facing a neighboring rib forms part of the shearing limitation device acting over the entire height of the corresponding connection terminal.

A second end rib 138f is formed by a partial rib devoid of the distal portion. This second rib is thus reduced to a stud, the uneven profile lateral edge 142 of which has only the proximal portion forming a base in the direct vicinity of the notch and the inclined plane for guiding the connection terminal in position. In this case, it is understood that the function for holding the connection terminal that is performed by the proximal portion is obtained by the presence of a wall of the frame 3, shown as a dashed line in FIG. 7.

As is particularly shown by way of an example in FIG. 5, two ribs 138c, 138d are respectively rigidly connected to a click and ratchet finger 116, by means of a fixing branch 154 extending perpendicular to the rib. The fixing branch stiffens the click and ratchet finger, especially since in this case the branch is arranged in the direction in which the click and ratchet finger would be likely to deform when click and ratchet fixing the frame with the connection interface. The resiliency required for the click and ratchet fixing is then mainly obtained through deformation of the frame supporting the bore.

The assembly of an additional heating device and its implementation in a heating, ventilation and/or air conditioning installation will now be described.

The heating elements are inserted into the housings formed in the frame, on the side of the opening that is subsequently closed by the connection interface 100. The heating elements are pushed to the bottom of the frame, and only the free ends of the electrodes, provided with connection terminals 126, exceed the frame through the insertion opening.

The frame is then closed by applying the electrical connection interface so as to cover this opening, and by attempting to successively match the positioning pins 114 rigidly connected to the connection interface 100 with the shafts 113 rigidly connected to the frame (particularly shown in FIGS. 1 and 3), the stud 120 with the recess 122 formed in a wall of the frame (particularly shown in FIG. 9), then the click and ratchet fingers 116 with the corresponding bores 118 formed in the frame (particularly shown in FIG. 1).

As previously specified, stiffening the click and ratchet fingers 116 by the connection to the ribs 138 involves fixing the connection interface 100 on the frame by resilient deformation of the proximal wall of the frame to allow the click and ratchet fingers 116 to pass toward the bores.

As the connection interface 100 and the frame are brought together, it is understood that the free ends of the connection terminals 126 approach the inner face 110 of the panel 102 and therefore the notches 124 that emerge on this inner face. Firstly, the free ends of the connection terminals 126 are inserted between two free end edges 144 (shown in FIG. 6) of the ribs 138 of a pair forming a shearing limitation device 101, then they are guided, particularly by the ramp formed by the intermediate part 148 of the uneven profile edge 142 of one of the ribs of this pair, toward the notch 124.

The frame, the heating elements and the electrical connection interface are sized so that, at the end of the assembly of the additional heating device, i.e. when the click and ratchet fingers 116 of the connection interface are accommodated in the bores 118 formed in the frame, the connection terminals 126 have passed through the notches in order to project from the outer face of the panel, in the sheath, in the position shown in FIG. 2, in order to be able to be electrically connected to a source network. In this position, the fins 134 come into abutment against the inner face of the panel and the connection sleeve is press fitted, or at the very least tightly fitted, between the lateral edges facing two neighboring ribs, which in pairs form a shearing limitation device.

Furthermore, and as is particularly shown in FIG. 7, which shows the proximal wall of the frame as a dashed line, the ribs 138 extend over a size that is such that they do not exceed the proximal wall of the frame, and therefore such that they are not located in the air flow caused to pass through the heating elements of the additional heating device when said device is in place in the ventilation, heating and/or air conditioning installation.

Provision also can be made for the ribs 138 to come into abutment against the fin of the closest heating element of the connection interface and directly facing the corresponding rib, and in this context it will be worthwhile providing a longitudinal size for the proximal wall of the frame that is such that the rib can be in contact with the fin and such that, at the same time, the rib is not located in the air flow.

When the additional heating device is mounted on the ventilation, heating and/or air conditioning installation, the vibrations experienced by the additional heating device cause the heating elements to move inside the frame, particularly in the vertical direction. These movements are limited in the additional heating device comprising a connection interface 100 according to the invention, due to the presence of a straight lateral edge 140 of a first rib against the connection terminal 126 when the heating elements are moved in a direction of movement T1, shown in FIG. 7, and due to the presence of an uneven profile lateral edge 142 of a second rib against the connection terminal when the heating elements are moved in a second direction of movement T2, shown in the same FIG. 7.

Due to the presence of the shearing limitation device, i.e. the presence of components for increasing the contact zone between the electrical connection interface and the connection terminals in the direction for inserting heating elements into the notches of the connection interface, the shearing risk is limited. However, it is understood that a residual shearing effect with lower amplitude can be identified at the end of the contact zone, when the ribs are no longer in contact or are in close proximity to the electrodes via the connection terminal. Moreover, it is also understood that the more the heating elements are subject to vibrations, the more this residual shearing effect increases.

The additional heating device according to the invention consequently can comprise, in addition to the previously described shearing limitation device, a device for limiting the travel of the heating elements fixed on the frame.

More specifically, and with reference to FIGS. 10 and 11, the travel limitation device comprises a part that is placed against a face of the frame, in abutment on at least one wall defining the frame so as to partially cover heating elements, and this part comprises one or more openings configured to each receive a pin rigidly connected to the frame. The pin is configured in order to be plastically deformed when it is located inside the opening, so as to press the travel limitation device against the heating elements by setting the position of this travel limitation device on the frame and so as to exert a bearing force in order to press them into their housing in the frame.

At least one of the walls 21, 22, 23, 24, 25 forming at least one of the housings of the heating elements comprises at least one pin 4 configured to be inserted into an opening arranged on the device 10 for limiting the travel of the heating elements 5, 51, 52. The pins 4 extend, by projecting from the wall from which they originate, opposite the heating compartment 30. The pins are thus oriented toward the outside of the electric heating device 10.

The pins 4 in this case are located on the longitudinal walls 22, 23, 24, whether they are lateral or intermediate walls. More specifically, the pins 4 can be grouped per the set in which they are aligned along the vertical axis V of the heating device 10, and each set of aligned pins is intended to engage with the same travel limitation device 10. "Aligned" is understood to mean that an imaginary straight line exists that passes through each of the centers of the free faces of the pins 4, with this imaginary straight line being parallel to the vertical axis V of the heating device 10. The pins 4 are integrally formed with the wall 22, 23, 24 of the housing, particularly through a single molding operation.

The same wall comprises as many pin(s) 4 as the number of travel limitation device(s) 10 provided on the frame 3. According to the embodiment shown in the figures, each longitudinal wall 22, 23, 24 comprises two pins 4 located at two opposite ends of the longitudinal wall 22, 23, 24, so that two sets of aligned pins are formed as previously defined, which are capable of respectively engaging with a travel limitation device. Thus, two travel limitation devices 10 are provided to engage with this frame 3. It is to be noted that, if it is clear that the pins 4 of the same set are located on the same face of the frame, the two sets can be located on the same face of the frame 3, i.e. on the front face or on the rear face, or even on two opposite faces, i.e. a first set of aligned pins disposed on the front face and a second set of aligned pins disposed on the rear face.

As can be particularly seen in FIG. 11, the longitudinal walls comprising a pin 4 also comprise gaps 45 longitudinally located on either side of each pin 4. The gaps 45 correspond to recesses that in this case are produced in the longitudinal walls 22, 23, 24, allowing a space to be provided for accommodating the travel limitation device 10. Each gap 45 extends, along the longitudinal axis L, from a pin 4 to a shoulder, and over a longitudinal size that is substantially equal to the longitudinal size of the pin, and each gap 45 extends along the vertical axis V over the entire size of the corresponding longitudinal wall 22, 23, 24, so as to fully pass through this longitudinal wall.

FIG. 1 shows a heating device 1 comprising the frame 3 and two travel limitation devices 10 engaging with this frame 3, with the assembly formed by the frame and the travel limitation devices 10 being in a pre-positioning position, i.e. a position in which the pins are in their original shape, not yet plastically deformed, and FIG. 11 shows the same assembly with the travel limitation devices that are in a set fixing position following the plastic deformation of the pins.

It can be seen that, in the pre-positioning position, the travel limitation device 10 is engaged in the gaps 45 provided on either side of each pin 4 and that it comprises openings 11 sized to be passed through by the pins 4.

It is to be noted that the thickness of each pin 4, measured along the transverse axis T, is such that the pin 4 exceeds the travel limitation device 10 when said device is engaged on the frame 3. In other words, the thickness of each pin 4 is greater than a thickness of the travel limitation device 10 in the vicinity of the opening 11, with the thicknesses being measured along the transverse axis T. This difference in thicknesses, as well as the location of the pin 4, can allow the pin 4 to be accessed by a tool intended for the plastic deformation of this pin 4. Indeed, the pin 4 is intended to be deformed inside the opening 11, whilst preventing the travel limitation device 10 from being deformed during this process. The purpose of the plastic deformation of the pin 4 is to ensure that the travel limitation device 10 is fixed on the frame 3, preferably a tight fit, which allows travel to be limited and even allows a retention force to be exerted on the heating elements 5, 51, 52.

The plastic deformation can be achieved by means of a hot deformation process, such as by a hot or ultrasonic riveting technique. Thus, under the effect of the heat, the pin 4 melts and expands in the opening 11 of the travel limitation device 10. The material that is thus softened adheres to the wall defining the opening when it cools. The fact that the pin 4 exceeds the travel limitation device 10 allows surplus material to be provided in order to ensure that the pin 4 fills the opening 11 once the hot plastic deformation is complete and that, where appropriate, some of the material of the deformed pin spreads over the surface of the travel limitation device 10, particularly around the opening 11. To this end, the surface of the travel limitation device 10 can comprise a reception zone for the part of the plastically deformed pin 4 overflowing the opening 11.

It is to be noted that the plastic deformation is completed under the stress of a machine-tool that helps to press the travel limitation device against the heating elements and that advantageously can maintain a pressure in order to continue to press these elements until the deformed material of the pin cools and is adhered to the walls defining the opening and/or to the reception zone of the surface around the opening.

Following plastic deformation of the pins 4, the travel limitation device 10 engages with the frame 3 so as to exert a force F perpendicular to the median plane M of the frame 3, thus allowing the heating elements 5, 51, 52 to be pressed, in particular, against the one or more vertical walls 21 located opposite the travel limitation device 10. In other words, the force F that is exerted to hold the heating elements 5, 51, 52 follows a direction parallel to a direction followed by the air flow F1 circulating through the electric heating system.

Such fixing allows the heating elements 5, 51, 52 to be retained, whilst limiting any travel in a direction that can be both perpendicular to the median plane M of the frame 3 and parallel to this median plane M, whilst dispensing with resilient elements that are likely to vibrate and to break.

It is to be noted that the force exerted by the travel limitation device to retain heating elements is perpendicular to the direction of extension of the contact zone formed by the shearing limitation device, i.e. the direction for inserting the heating elements in the notches formed in the connection interface.

It can be seen in FIG. 1 or in FIG. 11 that the size of the travel limitation device 10, measured along the vertical axis V, is at least equal to and, in this case, greater than the corresponding size of the heating compartment 30. Thus, a single travel limitation device 10 can limit the travel of all the heating elements 5, 51, 52 present in the heating compartment 30.

These FIGS. 1 and 11 also show that, unlike the vertical walls 21, the travel limitation device 10 comprises an inner face 12, i.e. a face turned toward the heating compartment, which is substantially flat in order to come into contact with the heating elements 5, 51, 52. The vertical walls 21, for their part, comprise a median step allowing passage of a glued joint (not shown herein) connecting the electrodes 54, the PTC resistors 55 and the radiating elements 53 and that slightly transversely projects from the heating elements. Furthermore, a clearance is provided between the vertical walls 21 and the heating elements 5, 51, 52 in order to allow the heating elements 5, 51, 52 to be inserted into their respective housings 7, 71, 72 without any effort.

FIG. 10 shows the travel limitation device 10 in greater detail, and particularly a second face, or outer face 13, opposite the inner face 12, i.e. turned toward the outside of the heating device 1 when the travel limitation device is mounted on the frame. This outer face 13 in this case comprises stiffening ribs 14 surrounding windows 15 provided on the travel limitation device 10. These windows enable the through-circulation of the air flow F1. Advantageously, there are as many window(s) 15 as there are housing(s) provided in the frame 3. In this case, there are therefore two windows 15 with respective heights, measured along the vertical axis, that are proportional to the heights of the housings, so as to respectively overhang a housing. Thus, the highest window 15 is intended to superpose the second housing, i.e. that which also is the highest, whereas the lowest window 15 is intended to superpose the first housing, i.e. that which is lowest.

In the example shown, the travel limitation device 10 comprises three openings 11 configured to receive the pins 4, which are rigidly connected to the frame 3. More specifically, the openings are sized so that, following plastic deformation, the deformed pin 4 fills the entire opening 11. Filling the opening 11 is understood to mean that the pin 4 at least partly plugs the opening so that the deformed material of the pin adheres at least to the walls defining the opening in order to set the position of the travel limitation device 10 on the frame 3. Like the pins 4, it is to be noted that the number of openings 11 is N+1, with N corresponding to a number of housings 7, 71, 72 provided in the frame 3.

In the example shown, the openings 11 each have a center aligned on a median axis of the travel limitation device 10.

The travel limitation device 10 can also comprise a position retention system 16 that is distinct from the opening 11. This position retention system 16 helps to pre-position the travel limitation device 10 on the frame 3 of the electric heating device 1, before the one or more pins 4 is/are plastically deformed, and sets the position of the travel limitation device 10. In the pre-positioning phase it is understood that, in addition to the engagement of the non-deformed pin 4 and the opening 11, the travel limitation device 10 is retained on the frame 3 using this position retention system 16. Of course, such retention is only useful before the step of plastically deforming the pin 4. Indeed, it is understood that this position retention system 16 allows reversible connection of the travel limitation device 10 to the frame 3, and that this has the advantage of preventing disconnection of an assembly formed by the travel limitation device 10 and the frame 3 during various handling operations before the step of plastically deforming the pin 4, the purpose of which is to irreversibly set the positions of the components of this assembly.

More specifically, this position retention system 16 comprises at least one click and ratchet element 17 intended to engage with the frame 3 and, more specifically, with an aeration slot 90 provided on the bars 9 of the frame 3. In the example shown, the click and ratchet element 17 mainly extends perpendicular to the inner face 12 of the travel limitation device 10 and in this case it corresponds to a finger 170 comprising a hook 171 at the tip thereof.

The previous description clearly explains how the invention allows its intended objectives to be achieved and particularly proposes a heating device, in which the connection of the heating elements is secured, particularly by increasing the contact zone between the connection interface and the connection terminals specific to these heating elements. The connection interface according to the invention thus has a dual function, namely an electrical connection function to allow heating modules to be connected to an electric power source and a mechanical function for limiting shearing that can be generated at the connection of the electrodes in the suitable notches.

The invention claimed is:

1. An electrical connection interface of a device for electrically heating an air flow circulating inside a heating, ventilation and/or air conditioning installation of a motor vehicle, said connection interface comprising:
    in a panel, at least one notch sized for receiving a connection terminal mounted at the end of an electrode of a heating element of the electric heating device; and
    at least one shearing limitation device for limiting the shearing of the connection terminal, which device extends by projecting from a first side of the panel in the vicinity of the notch,
        wherein the connection terminal extends through the at least one notch from the first side of the panel to a second side of the panel, and
        wherein an electrical contact of the connection terminal with a source network is established only on the second side of the panel.

2. The electrical connection interface as claimed in claim 1, wherein the shearing limitation device comprises at least one pair of ribs, which respectively extend by projecting from the panel, while being arranged on either side of the corresponding notch.

3. The electrical connection interface as claimed in claim 2, wherein the ribs of a pair of ribs are oriented perpendicular to the orientation of the corresponding notch.

4. The electrical connection interface as claimed in claim 2, further comprising a plurality of notches and a plurality of ribs associated in pairs with each of the notches.

5. The electrical connection interface as claimed in claim 4, wherein all the ribs extend perpendicular to the notches.

6. The electrical connection interface as claimed in claim 1, wherein the ribs are aligned one after the other.

7. The electrical connection interface as claimed in claim 4, wherein at least two successive ribs are identical.

8. The electrical connection interface as claimed in claim 4, wherein a rib disposed at the end of the series formed by the plurality of ribs is smaller than the corresponding size of the other ribs.

9. The electrical connection interface as claimed in claim 4, wherein at least one rib extends from one notch to the neighboring notch.

10. The electrical connection interface as claimed in claim 8, wherein the shearing limitation device formed by a pair of ribs is such that a first rib has a straight lateral edge and that a second rib has an uneven profile lateral edge.

11. The electrical connection interface as claimed in claim 10, wherein the uneven profile lateral edge has a proximal portion, which extends from the panel perpendicular to said panel and in the direct vicinity of the notch, and a distal portion forming a step relative to the proximal portion that is offset relative to the notch.

12. The electrical connection interface as claimed in claim 11, wherein the proximal portion and the distal portion are separated by an inclined intermediate portion forming a ramp for guiding the connection terminal toward the corresponding notch.

13. The electrical connection interface as claimed in claim 2, wherein the free end of at least one rib has a chamfer for guiding the connection terminal.

14. The electrical connection interface as claimed in claim 11, wherein the rib disposed at the end of the series is formed solely by one proximal portion in the direct vicinity of the notch.

15. The electrical connection interface as claimed in claim 1, further comprising at least one click and ratchet finger configured to engage with a bore formed in a wall of the electric heating device, and in that at least one rib is rigidly connected to said click and ratchet finger.

16. The electrical connection interface as claimed in claim 1, wherein the panel further comprises a stud disposed on the boundary of the shearing limitation device.

17. A heating device comprising:
    a connection interface having:
        in a panel, at least one notch sized for receiving a connection terminal mounted at the end of an electrode of a heating element of the electric heating device; and
        at least one shearing limitation device for limiting the shearing of the connection terminal, which device extends by projecting from a first side the panel in the vicinity of the notch,
            wherein the connection terminal extends through the at least one notch from the first side of the panel to a second side of the panel, and wherein an electrical contact of the connection terminal with an electrical network is established only on the second side of the panel; and a frame in which the at least one heating element is accommodated, the connection interface being configured to be mounted at one end of the frame in order to connect the device to the electrical network of the vehicle and the power supply of the heating elements.

18. The heating device as claimed in claim 17, wherein the frame comprises walls, which include at least one proximal vertical wall, on which the connection interface is fixed.

19. The heating device as claimed in claim 18, wherein at least one rib extends from the panel of the connection interface by having a size perpendicular to the panel that is less than the size of the proximal wall of the frame in the same direction.

20. The heating device as claimed in claim 19, further comprising:

a device for limiting the travel of the heating elements fixed on the frame, and one or more openings configured to each receive a pin rigidly connected to the frame, said pin being plastically deformed inside the opening, so as to press the travel limitation device against the heating elements and so as to exert a bearing force in order to press them into their housing in the frame.

* * * * *